(12) United States Patent
Morello

(10) Patent No.: US 7,306,755 B2
(45) Date of Patent: Dec. 11, 2007

(54) METHOD OF FABRICATING A STRAP WITH ROTATABLY MOUNTED CLIP

(75) Inventor: John R. Morello, Warren, OH (US)

(73) Assignee: Delphi Technologies, Inc., Troy, MI (US)

( * ) Notice: Subject to any disclaimer, the term of this patent is extended or adjusted under 35 U.S.C. 154(b) by 305 days.

(21) Appl. No.: 11/068,024

(22) Filed: Feb. 28, 2005

(65) Prior Publication Data

US 2006/0192059 A1    Aug. 31, 2006

(51) Int. Cl.
 *B29C 45/16* (2006.01)
(52) U.S. Cl. .................. 264/219; 264/242; 264/328.8
(58) Field of Classification Search ............... None
 See application file for complete search history.

(56) References Cited

U.S. PATENT DOCUMENTS

| | | | |
|---|---|---|---|
| 3,550,219 A * | 12/1970 | Van Buren, Jr. | 248/73 |
| 4,135,749 A | 1/1979 | Caveney et al. | |
| 4,572,466 A * | 2/1986 | Yamaguchi et al. | 248/73 |
| 5,148,582 A * | 9/1992 | Dennis, Jr. | 24/625 |
| 5,161,287 A * | 11/1992 | Picollet | 24/601.2 |
| 5,829,937 A * | 11/1998 | Morello et al. | 411/510 |
| 5,984,242 A * | 11/1999 | Meyer | 248/65 |
| 6,667,002 B1 * | 12/2003 | Meyer | 264/138 |

* cited by examiner

*Primary Examiner*—Edmund H. Lee
(74) *Attorney, Agent, or Firm*—David P. Wood

(57) ABSTRACT

A strap with rotatably mounted clip fabricated in a single molding operation. The strap includes a strap retention member and a plurality of teeth. The rotatable clip includes a clip member, a pedestal and a head. The pedestal is retained in a pedestal opening formed through the strap. In fabrication, a top mold insert is slid into a top of first and second mold halves and a bottom mold insert is slid into a bottom of the first and second mold halves. Plastic is then injected into the first and second mold halves to independently and separately form the strap and the clip in a single molding process, wherein the inserts provide a space between the pedestal opening and the pedestal to allow the clip to rotate relative to the strap.

3 Claims, 2 Drawing Sheets

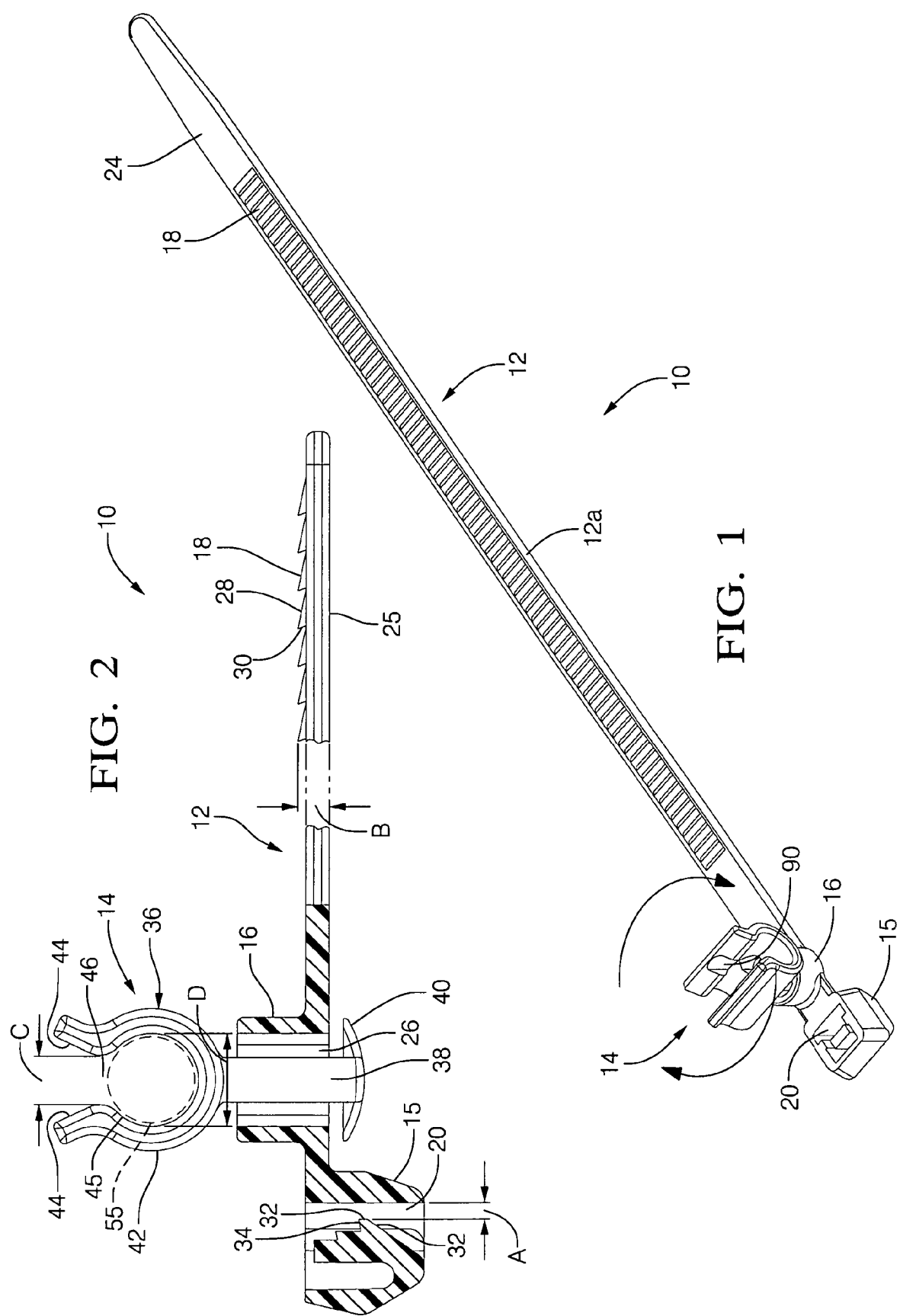

METHOD OF FABRICATING A STRAP WITH ROTATABLY MOUNTED CLIP

TECHNICAL FIELD

The present invention relates generally to retention straps for securing a first object to a second object and more specifically to a strap with rotatably mounted clip which is formed during a single molding operation.

BACKGROUND OF THE INVENTION

Retention straps are well known in the art. A retention strap includes a strap portion and a clip portion, wherein the clip portion is rotatably retained by the strap portion. The clip portion is sized to retain a first item, such as a cable. The strap portion is secured around a second object, such as a hose. The strap and clip are each fabricated separately by a plastic injection moldings and then assembled to each other in a secondary assembly operation. The double molding steps and the secondary assembly operations involve an additional expense and additional production time.

Of interest with respect to molding operations is U.S. Pat. No. 5,829,937 to Morello et al., which discloses a single step molding operation to produce a tolerance clip, wherein a two component die in combination with a vertically operated tool provide a stem molded at the same time as a tape bar, wherein the stem is slidable in a slot of the tape bar, even though the stem and tape bar were molded simultaneously.

What remains needed in the art is a strap with rotatably mounted clip which is formed during a single molding operation, without the need for a secondary assembly operation.

SUMMARY OF THE INVENTION

The present invention is a strap with rotatably mounted clip, which is fabricated in a single plastic injection molding operation which eliminates the need for a secondary assembly operation.

A strap includes a strap retention member formed at one end of the strap and a plurality of ramped teeth formed on a first side of the strap. The strap retention member includes a strap opening that is sized to receive the other end of the strap, wherein a pawl extends outward from a wall of the strap opening for ratchetably engaging the teeth as the strap is drawn through the strap opening.

An elevated boss extends outward from the first side of the strap, adjacent the strap retention member. A pedestal opening is formed through the elevated boss. A clip includes a pedestal, a clip member at one end of the pedestal and a head at the other end of the pedestal, wherein the length of the pedestal is greater than a combined thickness of the elevated boss and the strap. A perimeter of the pedestal is sized to be received by the pedestal opening and be rotatable with respect thereto.

The strap with rotatably mounted clip is formed according to a single molding process methodology using a mold assembly. In this regard, the strap with the exception of the elevated boss is similar in construction and manufacture to that of a "cable tie", which articles are very well known in the art, including the manufacture thereof, as exemplified by U.S. Pat. No. 4,135,749 to Caveney et al., which patent is hereby incorporated herein by reference to illustrate the manufacture of cable ties. Accordingly, the areas of the mold assembly which interact with the molding of the strap at the clip only need be detailed hereinbelow.

A mold assembly includes a first mold half, a second mold half, a top mold insert and a bottom mold insert. The first mold half includes a first clip cavity that produces one half of the clip member and a first head cavity that produces one half of the head. The second mold half includes a second clip cavity that produces the other half of the clip member and a second head cavity that produces the other half of the head. A first strap cavity is formed in the first mold half and a second strap cavity is formed in the second mold half to produce the strap. A first top insert cavity is formed in a top of the first mold half and a second top insert cavity is formed in a top of the second mold half. The first and second top insert cavities are sized to slidably receive the top mold insert. A first bottom insert cavity is formed in a bottom of the first mold half and a second bottom insert cavity is formed in a bottom of the second mold half. The first and second bottom insert cavities are sized to slidably receive the bottom mold insert. The pedestal opening is sized to receive the outer perimeter of the top and bottom mold inserts.

The first and second mold halves are then brought together. The top mold insert is slid into a top of the first and second mold halves and the bottom mold insert is slid into a bottom of the first and second mold halves. Plastic is injected into the first and second clip and head cavities, and, separately, plastic is injected into the first and second strap cavities. The first and second mold halves are then separated and the strap with rotatably mounted clip removed. The molding operation leaves a space between the pedestal opening and the outer perimeter of the pedestal so that the pedestal is freely rotational with respect to the strap.

Accordingly, it is an object of the present invention to provide a strap with rotatably mounted clip, which is formed during a single molding operation, without the need for a secondary assembly operation.

This and additional objects, features and advantages of the present invention will become clearer from the following specification of a preferred embodiment.

BRIEF DESCRIPTION OF THE DRAWINGS

FIG. 1 is a perspective view of a strap with rotatably mounted clip provided according to the molding method of the present invention.

FIG. 2 is a partly sectional side view of the strap with rotatably mounted clip of FIG. 1, particularly revealing a pedestal of a rotatable clip thereof.

DESCRIPTION OF THE PREFERRED EMBODIMENT

Figure 3:
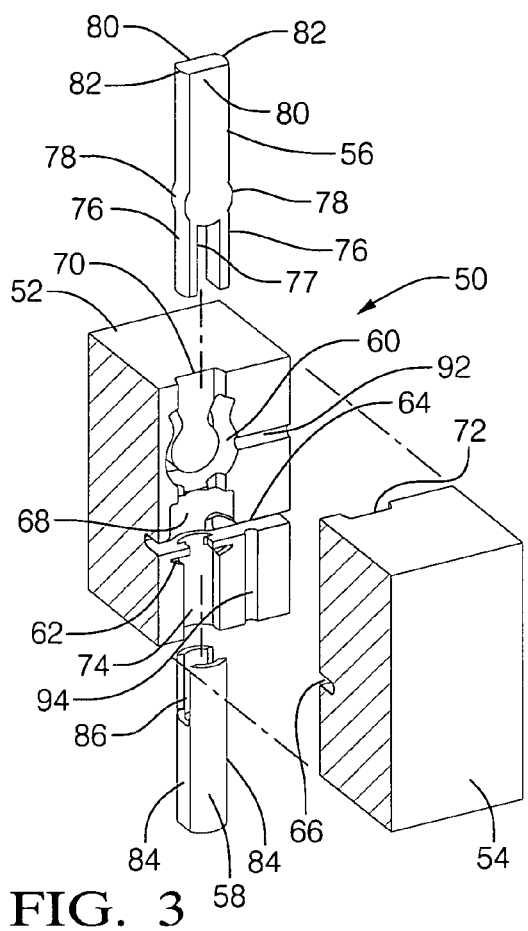
FIG. 3 is a perspective view of a mold assembly used to produce the strap with rotatably mounted clip as shown at FIG. 1.

Referring now to the Drawings, FIGS. 1 and 2 show a perspective view of a strap with rotatably mounted clip 10, which includes a strap 12 and a rotatable clip 14.

The strap 12 includes a strap body 12a, a strap retention member 15 at one end thereof, an elevated boss 16 adjacent the strap retention member, and a plurality of ramped teeth 18 on a first side 24 of the strap body, wherein the elevated boss extends outward from the first side 24. The strap retention member 15 includes a strap opening 20 that is sized to receive the other end of the strap body 12a. A catch pawl 22 extends outward from wall of the strap opening 20. A pedestal opening 26 is formed through the elevated boss 16 and the strap body 12a.

As recounted hereinabove, the strap 12, with the exception of the elevated boss 16, is similar in construction and manufacture to that of a cable tie, which articles are very well known in the art, including the manufacture thereof, as exemplified by hereinabove incorporated U.S. Pat. No. 4,135,749 to Caveney et al. In this regard, each ramped tooth 18 has a tooth incline surface 28 extending from the side face 24 of the strap and a tooth catch edge 30 at the termination of the incline surface; however, other tooth shapes may also be used. In this regard further, the catch pawl 22 preferably includes a pawl incline surface 32 and a catch pawl edge 34; however other shapes of pawls may also be used. The shape of the teeth incline surfaces 28 and the pawl incline surface 32 allow the strap to easily insert into and pass through the strap opening 20 in an insertion direction, but in the reverse direction a tooth catch edge 30 will unidirectionally engage against the catch pawl edge 34, thereby preventing the strap from reversing out of the strap opening; however, a release lever may be provided for selectively releasing the catch pawl with respect to the strap. In this regard, to allow the strap to be tightened, but not loosened, a dimension A, the distance between a top of the catch pawl 22 and the wall of the strap opening 20, and a dimension B, the distance between a top of the plurality of teeth 18 and the second face 25 of the strap body 12a, are such that dimension B is greater than dimension A in order to ensure an interference fit between the catch pawl 22 and a combined thickness of the strap 12 and the plurality of teeth 18.

The rotatable clip 14 includes a clip member 36, a pedestal 38 and a head 40. The clip member 36 is formed at one end of the pedestal 38 and the head 40 is formed at the other end of the pedestal. The clip member 36 includes a substantially circular arc base 42 with a pair of lead-in legs 44 extending from each end thereof. The length of the pedestal 38 is greater than a combined thickness of the strap 12 and the elevated boss 16, and the pedestal 38 is sized to be received by the pedestal opening 26 and be freely rotatable therein.

The clip member 36 is configured to selectively hold an article in a selectively releasable manner. This can be understood as follows. A dimension C is a distance across an entrance to the substantially circular arc base 42, and a dimension D is the width of an inner perimeter 45 of the substantially circle arc base 42. An article of generally cylindrical geometry 55, such as for example a cable or a plurality of wires, that has a greater width than dimension C at the entrance 46, but has a width less than the dimension D of the inner perimeter 45, is inserted into the clip member 36. In this regard, the dimension C of the entrance 46 resiliently increases when the cable or the plurality of wires are inserted therein, and an interference fit between the article 55 and the clip member 36 occurs at the entrance 46 when the article is seated at the inner perimeter 45, and thereby ensures the retention of the article in the clip member 36.

Figure 4:
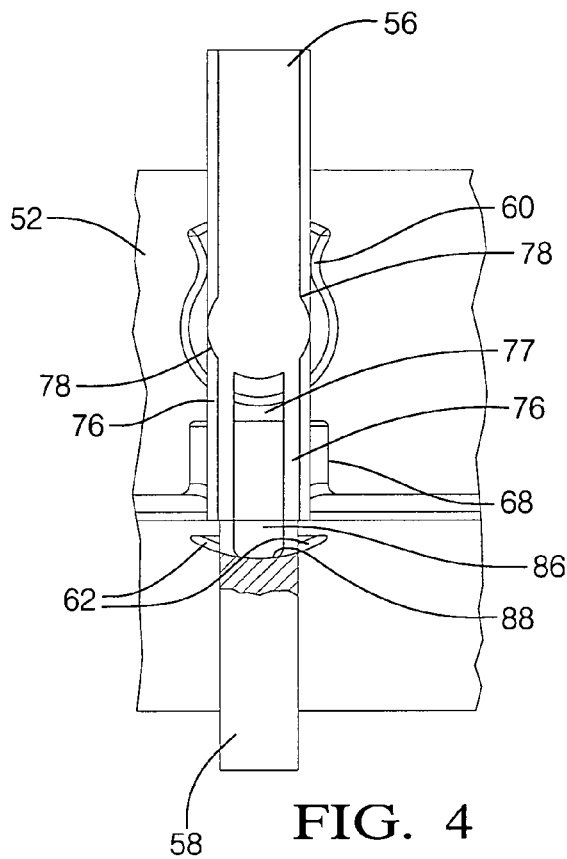
FIG. 4 is a side view of a first mold half with a top mold insert and a bottom mold insert placed therein.
Figure 5:
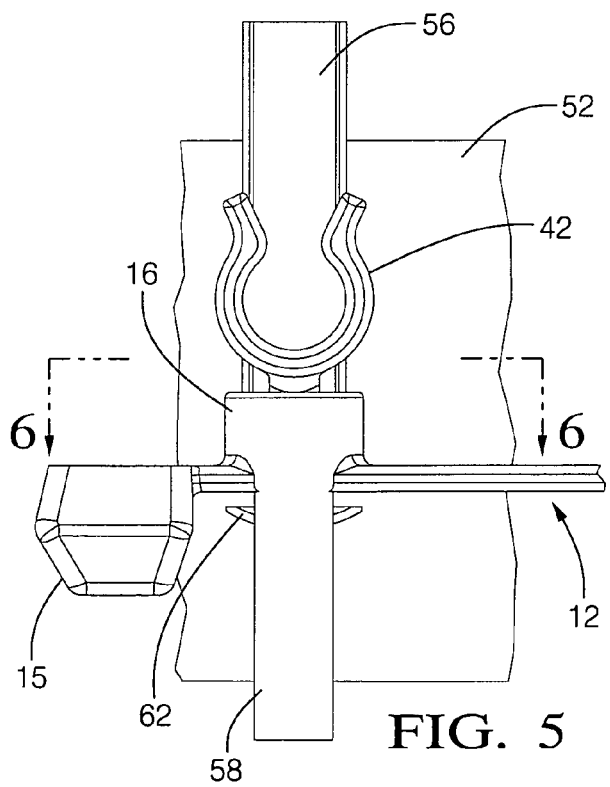
FIG. 5 is a side view of the first mold half with top and bottom mold inserts, now showing a portion of the strap with rotatably mounted clip formed thereby.
Figure 6:
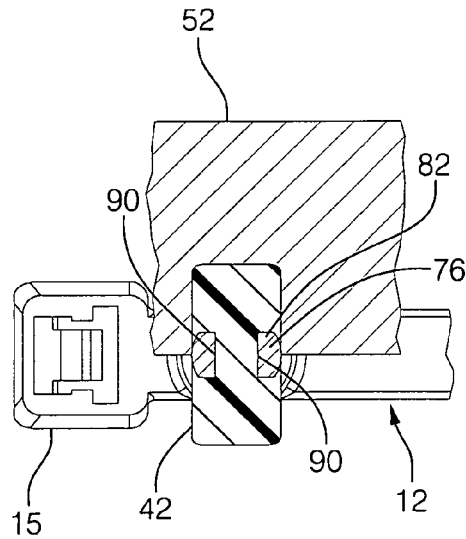
FIG. 6 is a cross-sectional view taken along line 6-6 of FIG. 5.

With reference to FIGS. 3 through 6 a preferred single molding operation methodology for fabricating the strap with rotatably mounted clip 10 will now be detailed using a mold assembly 50, wherein the strap 12 is fabricated at the same time as the rotatable clip 14. As recounted hereinabove, the strap 12 with the exception of the elevated boss 16 is similar in construction and manufacture to that of a cable tie, which articles are very well known in the art, including the manufacture thereof, as exemplified by U.S. Pat. No. 4,135,749 to Caveney et al., which patent was hereinabove incorporated herein by reference to illustrate the manufacture of cable ties. Accordingly, the areas of the mold assembly which interact with the molding of the strap at the clip only need be detailed hereinbelow for an artisan of ordinary skill in the art to fully comprehend the method of fabrication according to the present invention.

The mold assembly 50 includes a first mold half 52, a second mold half 54, a top mold insert 56 and a bottom mold insert 58. The first mold half 52 includes a first clip cavity 60 that produces one half of the clip member 36 and a first head cavity 62 that produces one half of the head 40. The second mold half 54 includes a second clip cavity (not shown, but a mirror image of the shown first mold half) that produces the other half of the clip member 36 and a second head cavity (not shown, but a mirror image of the shown first head cavity) that produces the other half of the head 40.

A portion of the strap 12 adjacent the elevated boss 16 is formed with a first strap cavity 64 and a second strap cavity 66, wherein the first strap cavity 64 is formed in the first mold half 52 and the second strap cavity 66 is formed in the second mold half 54. A first boss cavity 68 is formed in the first mold half 52 to create one half of the elevated boss 16. A second boss cavity (not shown, but a mirror image of the shown first boss cavity) is formed in the second mold half 54 to create the other half of the elevated boss 16. A first top insert cavity 70 is formed in a top of the first mold half 52 and a second top insert cavity 72 is formed in a top of the second mold half 54. The first and second top insert cavities are sized to slidably receive the top mold insert 56. A first bottom insert cavity 74 is formed in a bottom of the first mold half 52 and a second bottom insert cavity (not shown, but a mirror image of the shown first bottom insert cavity) is formed in a bottom of the second mold half 54. The first and second bottom insert cavities are sized to slidably receive the bottom mold insert 58.

The top mold insert 56 includes a pair of spaced apart legs 76 extending from a bottom thereof. A pedestal space 77 is formed between the pair of spaced apart legs 76. A pair of clip arcs 78 are formed on each side 82 of the top mold insert 56. The radius of each of the clip arcs 78 is the same as the radius of the inner perimeter 43 of the substantially circular arc member 42. A cross-section of the top mold insert 56 includes two flat opposing sides 80 in perpendicular disposition to the two opposing sides 82 which carry the clip arcs 78, wherein an outer perimeter of each clip arc 78 is flush with its respective side 82. The first and second top insert cavities 70, 72 are shaped to slidably receive the top mold insert 56 when the first and second mold halves are mutually joined.

The bottom mold insert 58 includes a pair of opposing flat surfaces 84 formed on a round cross-section. An outer perimeter of the first and second bottom mold cavities are sized to receive the perimeter of the bottom mold insert 58 when the first and second mold halves are mutually joined. The pair of opposing flat surfaces 84 prevent the bottom mold insert 58 from rotating relative to the first and second mold halves. A pedestal slot 86 is formed in a top of the bottom mold insert 58. The pedestal slot 86 is sized to slidably receive the pair of spaced apart legs 76 when the first and second mold halves are mutually joined and the top and bottom mold inserts are inserted therein. A combination of the pedestal slot 86 and the pedestal space 77 form an outer perimeter of the pedestal 38, wherein a bottom wall 88 of the pedestal slot 86 is preferably flush with a bottom of the first and second head cavities 62.

In operation, the first and second mold halves are mutually joined by being brought together. The top mold insert 56 is slid into the first and second top insert cavities by operation of a top actuating ram (not shown). The bottom mold insert is slid into the first and second bottom insert cavities by operation of a bottom actuating ram (not shown). Plastic is injected into the first and second clip cavities and the first and second head cavities through a first sprue 92; and, separately, plastic is injected into the first and second strap cavities and the first and second boss cavities through a second sprue 94. The injected plastic flows through the top and bottom mold inserts to form the pedestal 38. The first and second mold halves are separated and the strap with rotatably mounted clip 10 is removed. As a result of plastic flowing around the pair of spaced apart legs 76, two substantially semi-circular cavities 90 are left in the clip member 36. The molding operation leaves a space between the pedestal hole 26 and an outer perimeter of the pedestal 38 that allows the rotatable clip 14 to freely rotate relative to the strap 12.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method of fabricating a strap with rotatably mounted clip, comprising the steps of:
    forming a mold assembly comprising the steps of:
        forming a first mold half having a first clip cavity, a first strap cavity, a first head cavity, a first boss cavity, a first top insert cavity and a first bottom insert cavity;
        forming a second mold half having a second clip cavity, a second strap cavity, a second head cavity, a second boss cavity, a second top insert cavity and a second bottom insert cavity;
        forming a top mold insert having a pair of spaced apart legs extending from a bottom thereof, a pedestal space being formed between said pair of spaced apart legs; and
        forming a bottom mold insert, having a pedestal slot formed in a top thereof, said pedestal slot being sized to slidably receive said pair of spaced apart legs; and fabricating a strap with rotatably mounted clip, comprising the steps of:
    joining together said first and second mold halves;
    inserting said top mold insert into said first and second top mold cavities;
    inserting said bottom mold insert into said first and second bottom insert cavities, wherein the pedestal slot slidably receives the pair of spaced apart legs, and wherein a bottom wall of the pedestal slot is substantially flush with a bottom of the first and second head cavities;
    injecting plastic into said first and second clip cavities and into said first and second head cavities of said first and second mold halves;
    injecting plastic into said first and second strap cavities and into said first and second boss cavities of said first and second mold halves; wherein and said steps of injecting plastic collectively form the strap with rotatably mounted clip; and
    freeing said strap with rotatably mounted clip from said mold assembly;
    wherein said clip is joined to said strap in a freely rotatable relation with respect thereto.

2. A method of fabricating a strap with rotatably mounted clip, comprising the steps of:
    forming a mold assembly comprising the steps of:
        forming a first mold portion having a first clip cavity, a first strap cavity, a first head cavity, a first top insert cavity and a first bottom insert cavity;
        forming a second mold portion having a second clip cavity, a second strap cavity, a second head cavity, a second top insert cavity and a second bottom insert cavity;
        forming a top mold insert having a pair of spaced apart legs extending from a bottom thereof, a pedestal space being formed between said pair of spaced apart legs; and
        forming a bottom mold insert, having a pedestal slot formed in a top thereof, said pedestal slot being sized to receive said pair of spaced apart legs; and fabricating a strap with rotatably mounted clip, comprising the steps of:
    joining together said first and second mold portions with said top mold insert positioned in said first and second top mold cavities and with said bottom mold insert positioned in said first and second bottom insert cavities and with said pair of spaced apart legs positioned in the pedestal slot, wherein a bottom wall of the pedestal slot is substantially flush with a bottom of the first and second head cavities;
    injecting plastic into said first and second clip cavities and into said first and second head cavities of said first and second mold portions;
    injecting plastic into said first and second strap cavities of said first and second mold portions; wherein and said steps of injecting plastic collectively form the strap with rotatably mounted clip; and
    freeing said strap with rotatably mounted clip from said mold assembly;
    wherein said clip is joined to said strap in a freely rotatable relation with respect thereto.

3. The method of claim 2, wherein:
    said first mold portion further has a first boss cavity;
    said second mold portion further has a second boss cavity; and wherein
    the method further comprising the step of injecting plastic into said first and second boss cavities of said first and second mold portions.

* * * * *